United States Patent [19]

Asai

[11] Patent Number: 5,718,960
[45] Date of Patent: Feb. 17, 1998

[54] BONDED COMPOSITE DISK, AND METHOD AND APPARATUS FOR PRODUCING THE SAME WITH CONSISTENT ADHESIVE THICKNESS

[75] Inventor: Ikuo Asai, Nagoya, Japan

[73] Assignee: Kabushiki Kaisha Meiki Seisakusho, Japan

[21] Appl. No.: 595,801

[22] Filed: Feb. 2, 1996

[30] Foreign Application Priority Data

Oct. 26, 1995 [JP] Japan ................... 7-278532

[51] Int. Cl.$^6$ ........................................... B32B 3/00
[52] U.S. Cl. .......... 428/64.1; 428/64.2; 428/64.4; 428/65.2; 428/913; 369/275.1; 369/283; 264/1.33; 264/328.1; 264/328.8
[58] Field of Search ................. 428/64.1, 64.2, 428/64.4, 65.2, 913; 369/275.1, 283; 264/1.33, 328.1, 328.8

[56] References Cited

U.S. PATENT DOCUMENTS 4,781,879  11/1988  Oishi .................. 264/328.12
4,788,015  11/1988  Sakai et al. ............... 264/1.3
5,031,172   7/1991  Umeda et al. ............ 369/275.1

*Primary Examiner*—Patrick Ryan
*Assistant Examiner*—Elizabeth Evans
*Attorney, Agent, or Firm*—Parkhurst & Wendel

[57] ABSTRACT

Method and apparatus for forming a first and a second component disk which are bonded together to produce a bonded composite disk, wherein a first mold for forming the first component disk includes first mutually concentric components cooperating to define a molding surface for forming a bonding surface of the first component disk, while a second mold for the second component disk includes second mutually concentric components cooperating to define a molding surface for forming the bonding surface of the second component disk, and wherein the first mutually concentric components are dimensioned such that at least one of first annular boundaries between adjacent ones of the first mutually concentric components, which boundaries are located on the molding surface, has a diameter different from that of the corresponding second annular boundary between adjacent ones of the second mutually concentric components.

16 Claims, 4 Drawing Sheets

BONDED COMPOSITE DISK, AND METHOD AND APPARATUS FOR PRODUCING THE SAME WITH CONSISTENT ADHESIVE THICKNESS

BACKGROUND OF THE INVENTION

1. Field of the Invention

The present invention relates in general to techniques associated with a bonded composite disk such as a digital video disk (DVD), which is produced by bonding together two separately formed disks. More particular, this invention is concerned with an improved structure of such a bonded composite disk, a method of producing the composite disk, and molds for forming the two separate disks that are bonded together to produce the bonded composite disk.

2. Discussion of the Related Art

A bonded composite disk consisting of two separately formed disks that are integrally bonded together has recently been developed in an effort to provide a disk having increased data storage capacity. Such a bonded composite disk finds industrial applications as a digital video disk (DVD), for example. The bonded composite disk is usually produced by forming a first and a second component disk of a resin material using a mold as used for forming an ordinary disk, such that each of the formed first and second component disks has a thickness slightly smaller than a half of the nominal thickness of the composite disk to be produced. A reflector film and a protective film are formed on an information-bearing surface of each of the first and second component disks, as needed. Then, a film of a bonding adhesive is applied to the information-bearing surface of each component disk, and the two component disks are superposed on each other with the adhesive films contacting each other, so that the component disks are bonded together into the bonded composite disk.

An adhesive layer consisting of the two adhesive films interposed between the first and second component disks may advantageously function to accommodate thickness variations from the nominal values, if the thickness of the adhesive layer is sufficiently large; In some cases, however, the thickness of the adhesive layer cannot be made sufficiently large due to particular properties of the adhesive material and/or required dimensional specifications of the bonded composite disk. For example, where a digital video disk (DVD) is produced using a bonding adhesive which is curable by exposure to a ultraviolet radiation (UV-curable adhesive), it is generally difficult to form the adhesive layer with a thickness larger than 40 µm, due to the properties of a photosensitive polymer used as the UV-curable adhesive.

The adhesive films having a relatively small thickness may satisfy the requirements of the first and second component disks in terms of their configuration and dimensional accuracy, the resulting small thickness of the adhesive layer may cause poor bonding and low thickness accuracy of the bonded composite disk to be produced from the first and second component disks. Thus, the prior art suffers from a problem of a relatively high ratio of product rejects. This problem has not been found so serious in the research and development stage of such bonded composite disk, but it is considered to be a considerable barrier to achieving adequate production of the bonded composite disk on a commercial basis.

SUMMARY OF THE INVENTION

It is therefore a first object of the present invention to provide a bonded composite disk having a novel structure which permits improved production efficiency and yield ratio (reduced ratio of rejects).

A second object of this invention is to provide a method suitable for producing the bonded composite disk having such a novel structure with improved production efficiency and yield ratio.

A third object of the invention is to provide an apparatus suitable for producing a first and a second composite disks which are used to produce such an improved bonded composite disk.

The present invention was made as a result of extensive experiments and studies on a bonded composite disk, which revealed that the high ratio of rejects or low yield ratio of the bonded composite disk in the prior art was likely to arise from burrs which are formed with a relatively small height on the first and second component disks during formation thereof using the mold.

Generally, the mold for forming the first and second component disks separately from each other includes a stationary mold half fixed to a stationary member of a suitable clamping device, and a movable mold half fixed to a movable member of the clamping device. The stationary and movable mold halves have respective first and second molding surfaces cooperating to define therebetween a mold cavity for forming the component disks. Usually, one of the first and second molding surfaces which functions to form a bonding surface (information-bearing surface) of each component disk is defined by axial end faces of mutually concentric components such as an annular stamper, a female cutter sleeve, an ejector sleeve, a stationary guide sleeve and an annular stamper holder. The annular stamper is held by the stamper holder on an annular mirror plate, and the sleeves and the stamper holder extend through a center bore of the annular mirror plate and the annular stamper. The stamper stores information to be copied on the bonding surface of the component disk. The adjacent ones of the mutually concentric components inevitably have a clearance or gap of at least 10 µm. In particular, the clearances between the axially reciprocated ejector sleeve and the adjacent components should be as large as 10–30 µm. Therefore, a resin material for the component disks is likely to flow into those clearances when the component disk is formed by filling the mold cavity with the resin material. Thus, annular burrs having a relatively small height are likely to be formed on the information-bearing surfaces (bonding surfaces) of the first and second component disks. Experiments conducted by the present inventor showed the formation of an annular burr on a portion of the formed component disk which corresponds to a boundary between the ejector sleeve and the stationary guide sleeve, and the formation of an annular burr on a portion of the formed component disk which corresponds to a boundary between the stationary guide sleeve and the annular stamper holder. The former burr had a maximum height of 20–30 µm while the latter burr had a maximum height of 15–25 µm, where the component disks were formed of a polycarbonate material.

In the presence of such annular burrs formed on the first and second component disks formed by the conventional mold, the two component disks cannot be adequately bonded together with a bonding adhesive. Namely, even if the component disks formed have a shape and thickness dimension within predetermined tolerances, the thickness of the bonding adhesive which is equal to a distance between the bonding surfaces of the two component disks cannot be consistently controlled to a value close to the nominal value, because the annular burrs on the two component disks abut on each other. Consequently, the produced bonded composite disk tends to suffer from poor bonding of the two component disks and a high ratio of rejects due to excessive deviation of the thickness dimension of the composite disk from the nominal value. The present invention was developed in the light of the above finding.

The first object indicated above may be achieved according to a first aspect of this invention, which provides a bonded composite disk consisting of a first component disk and a second component disk which are formed separately from each other and which are bonded together at respective bonding surfaces thereof with a layer of a bonding adhesive interposed between the bonding surfaces, the first and second component disks being produced by a method comprising the steps of: (a) preparing a first mold and a second mold each of which includes a stationary mold half and a movable mold half which have respective first and second molding surfaces cooperating to define therebetween a mold cavity for forming a corresponding one of said first and second component disks, one of the first and second molding surfaces of each mold functioning to form the bonding surface of the corresponding one of the first and second component disks, each of the first and second molds including a plurality of mutually concentric components having respective axial end faces which cooperate to define the above-indicated one of the first and second molding surface, the mutually concentric components being dimensioned such that each of at least one of a plurality of first annular boundaries between adjacent ones of the mutually concentric components in the first mold, which first annular boundaries are located on the above-indicated one of the first and second molding surfaces of the stationary and movable mold halves, has a diameter different from that of a corresponding one of at least one of a plurality of second annular boundaries between adjacent ones of said mutually concentric components in the second mold; (b) forming the first and second component disks of the bonded composite disk by filling the mold cavities of the first and second molds with a material of each of the first and second component disks; and (c) superposing the first and second component disks such that said bonding surfaces each formed by the above-indicated one of the first and second molding surfaces of the stationary and movable mold halves of each mold are opposed to each other, with the layer of the bonding adhesive being interposed between the bonding surfaces to bond the first and second component disks together to produce the bonded composite disk.

In the bonded composite disk of the present invention, the first annular boundary or boundaries on the first or second molding surface in the first mold has/have a diameter or diameters different from that or those of the second annular boundary or boundaries on the corresponding first or second molding surface in the second mold, so that the annular burr or burrs formed on the bonding surface of the first component disk is/are radially spaced from the annular burr or burrs formed on the bonding surface of the second component disk.

In the absence of interference of the burrs on the first component disk with the burrs on the second component disk, the two component disks can be bonded together with the adhesive layer having a thickness suitable to assure sufficient bonding strength of the two component disks and to permit the bonded composite disk to have a thickness substantially equal or close to the nominal value. Thus, the present bonded composite disk can be produced with an improved yield ratio, namely, a significantly reduced ratio of rejects due to poor bonding or excessive deviation of the thickness value from the nominal value.

The second object indicated above may be achieved according to a second aspect of the present invention, which provides a method of producing a bonded composite disk consisting of a first component disk and a second component disk which are formed separately from each other and which are bonded together at respective bonding surfaces thereof with a layer of a bonding adhesive interposed between the bonding surfaces, the method comprising the steps of: (a) preparing a first mold and a second mold each of which includes a stationary mold half and a movable mold half which have respective first and second molding surfaces cooperating to define therebetween a mold cavity for forming a corresponding one of the first and second component disks, one of said first and second molding surfaces of each mold functioning to form the bonding surface of the corresponding one of the first and second component disks, each mold including a plurality of mutually concentric components having respective axial end faces which cooperate to define the above-indicated one of the first and second molding surface, the mutually concentric components being dimensioned such that each of at least one of a plurality of first annular boundaries between adjacent ones of the mutually concentric components in the first mold, which first annular boundaries are located on the above-indicated one of the first and second molding surfaces of the stationary and movable mold halves, has a diameter different from that of a corresponding one of at least one of a plurality of second annular boundaries between adjacent ones of said mutually concentric components in the second mold; (b) forming the first and second component disks of the bonded composite disk by filling the mold cavities of the first and second molds with a material of each of the first and second component disks; and (c) superposing the first and second component disks such that the bonding surfaces each formed by the above-indicated one of said first and second molding surfaces of the stationary and movable mold halves of each mold are opposed to each other, with the layer of the bonding adhesive being interposed between the bonding surfaces to bond the first and second component disks together to produce the bonded composite disk.

The method of the present invention described above assures production of the bonded composite disk with improved efficiency and an increased yield ratio with a significantly reduced ratio of rejects, owing to the use of the first and second molds whose first and second annular boundaries have different diameters so that the annular burrs formed on the first and second component disks are radially offset or spaced from each other and do not interference with each other.

The third object indicated above may be achieved according to a third aspect of this invention, which provides an apparatus for forming a first component disk and a second component disk which are bonded together at respective bonding surfaces thereof with a layer of a bonding adhesive to produce a bonded composite disk, said apparatus comprising: (i) a first mold including a plurality of first mutually concentric components having respective axial ends which cooperate to define one of a first and a second molding surfaces which cooperate to define therebetween a first mold cavity for forming the first component disk, the above-indicated one of the first and second molding surfaces functioning to form the bonding surface of the first component disk; (ii) a second mold including a plurality of second mutually concentric components having respective axial ends which cooperate to define one of a first and a second molding surfaces which cooperate to define therebetween a second mold cavity for forming the second component disk, the above-indicated one of the first and second molding surfaces of said second mold functioning to form the bonding surface of said second component disk. The plurality of first mutually concentric components of the first mold are dimensioned such that each of at least one of a plurality of first annular boundaries between adjacent ones of the first mutually concentric components of the first mold, which first annular boundaries are located on the above-indicated one of the first and second molding surfaces, has a diameter different from that of a corresponding one of at least one of a plurality of second annular boundaries between adjacent ones of the second mutually concentric components of the second mold.

The apparatus of the present invention described above assures production of the bonded composite disk with an increased yield ratio with a significantly reduced ratio of rejects, owing to the first and second annular boundaries which have different diameters so that the annular burrs formed on the first and second component disks are radially offset or spaced from each other and do not interference with each other.

In the present apparatus constructed as described above, it is desirable that the diameters of all of the first annular boundaries be different from those of the second annular boundaries. However, only a selected set or sets of the first and second annular boundaries whose radial position or positions is/are critical in terms of the annular burrs to be formed there may have different diameters. For instance, where the first and second mutually concentric components of the first and second molds include a first and a second ejector sleeve, respectively, at least one of the outside and inside diameters of the first ejector sleeve is made different from the corresponding diameter of said second ejector sleeve.

Usually, the ejector sleeve is axially slidably received in an adjacent guide sleeve, for removing the formed component disk from the mold. In this case, an annular clearance between the guide sleeve and the ejector sleeve should be comparatively large for facilitating reciprocating movements of the ejector sleeve in the axial direction relative to the guide sleeve. This results in easy flow of the resin material into the comparatively large annular clearance, and consequent formation of an annular burr at a portion of the formed component disk which corresponds to the annular boundary between the guide sleeve and the ejector sleeve of each mold. However, where the diameter of the above-indicated annular clearance in the first mold is different from that in the second mold, the annular burrs thus formed on the first and second component disks are offset or spaced from each other in the radial direction of the sleeves, so as to avoid an interference of the annular burrs. Thus, the above arrangement assures improved accuracy of the distance between the bonding surfaces of the two component disks and increased strength of bonding of the two component disks with the adhesive layer interposed between the bonding surfaces.

BRIEF DESCRIPTION OF THE DRAWINGS

The above and other objects, features, advantages and technical and industrial significance of the present invention will be better understood by reading the following detailed description of a presently preferred embodiment of the invention, when considered in connection with the accompanying drawings, in which.

DETAILED DESCRIPTION OF THE PREFERRED EMBODIMENT

Figure 1:
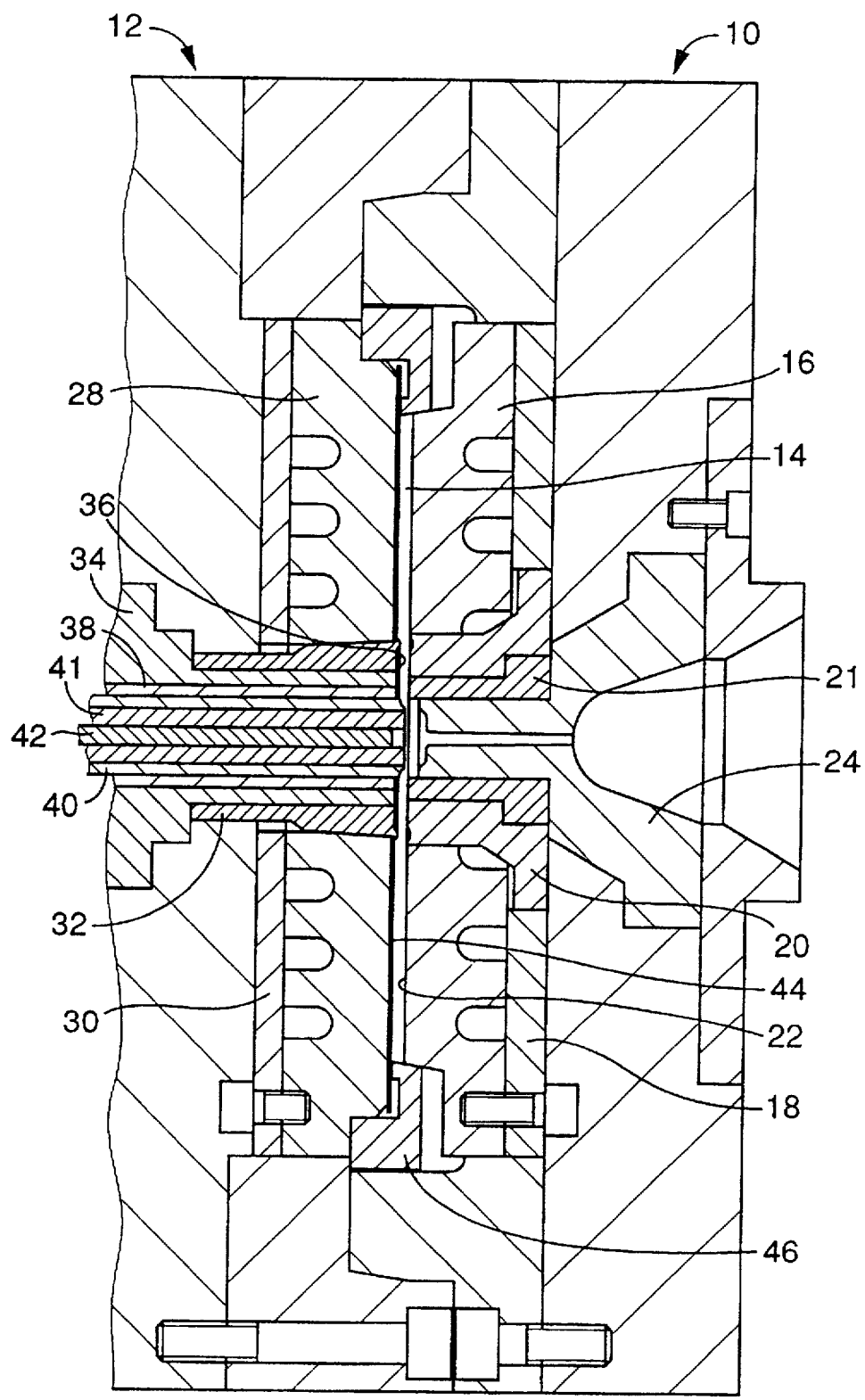
FIG. 1 is a fragmentary view in longitudinal cross section of a mold constructed and used according to one embodiment of this invention for forming one of a first and a second component disk which are bonded together to produce a bonded composite disk.

Referring first to FIG. 1, there is shown a mold for forming one of a first component disk and a second component disk which are bonded together to produce a bonded composite disk. The mold has a stationary mold half 10 and a movable mold half 12. The stationary mold half 10 is attached to a stationary member of a mold clamping device, while the movable mold half 12 is attached to a movable member of the mold clamping device, as well known in the art. The movable member of the mold clamping device is movable toward and away from the stationary member, so that the movable mold half 12 is movable toward and away from the stationary mold half 10. Thus, the mold has an open position and a closed position.

Figure 4:
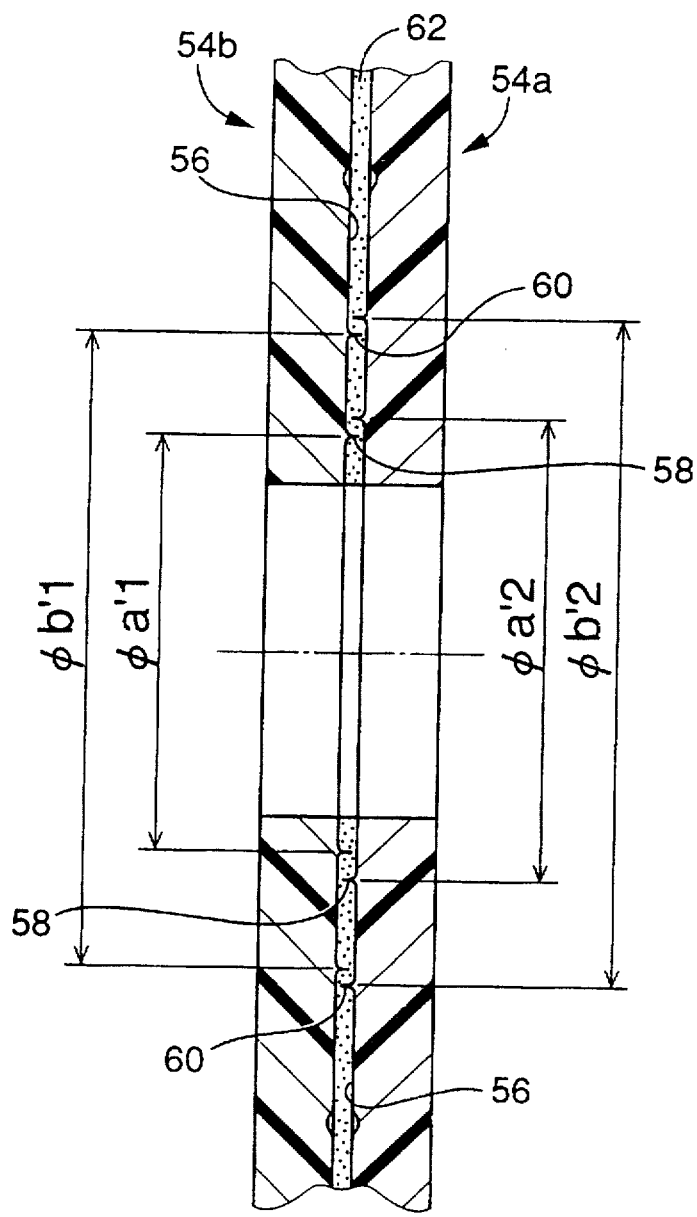
FIG. 4 is an enlarged view in cross section showing an example of a bonded composite disk constructed according to the present invention.

In the closed position of FIG. 1 in which the stationary and movable mold halves 10, 12 are located close to each other, there is defined a mold cavity 14 therebetween, for forming the first or second component disk of the bonded composite disk. Namely, the first and second component disks 54a, 54b as shown in FIG. 4 are formed by respective first and second molds each of which has the stationary and movable mold halves 10, 12. As described below, however, the dimensions of some components of the first mold are slightly different from those of the corresponding components of the second mold. On each of the first and second component disks 54a, 54b, there are formed a reflection film and other films as needed. Further, a film of a bonding adhesive is applied to each of the bonding surfaces of the first and second component disks 54a, 54b, and the two disks 54a, 54b are superposed on each other with the adhesive films contacting each other. Thus, the desired bonded composite disk used as a DVD (digital video disk) for example is produced. The two adhesive films constitute an adhesive layer 62 as shown in FIG. 4.

To the body of the stationary mold half 10, there is fixed an annular stationary mirror block 16 through a back plate 18. The stationary mirror block 16 has a relatively large wall thickness and an annular mirror surface which partly defines the mold cavity 14. A center bushing 20 extends through central portions of the annular stationary mirror block 16 and the back plate 18, in the axial direction of the annular block 16. The center bushing 20 has a center bore in which is received a female cutter sleeve 21 used to remove a central portion of the first or second component disk 54a, 54b to be formed by the mold. The female cutter sleeve 21 has a center bore in which is received a portion of a sprue bushing 24.

The stationary mold half 10 has a first molding surface 22, which is provided by the annular mirror surface of the stationary mirror block 16 and the corresponding axial end faces of the center bushing 20 and female cutter sleeve 21 that are concentric or coaxial with the mirror block 16. The first molding surface 22 functions to form a surface of the first or second component disk 54a, 54b which is remote from the bonding surface (information-bearing surface).

This surface of the component disk formed by the first molding surface 22 provides an exposed surface of the bonded composite disk which is remote from the adhesive layer 62.

As is known in the art, the mold cavity 14 partially defined by the first molding surface 22 of the mold half 10 is filled with a resin material, which is injected into the mold cavity 14 through the sprue bushing 24 connected to a nozzle of an injecting device. To facilitate removal of the formed first or second component disk 54a, 54b from the mold half 10 upon opening of the mold 10, 12, a stream of compressed air is applied to the first molding surface 22 through a clearance or gap between the female cutter sleeve 21 and the center bushing 20.

To the body of the movable mold half 12, there is fixed an annular movable mirror block 28 through a back plate 30. Like the stationary mirror block 16 of the stationary mold half 10, the movable mirror block 16 has a relatively large wall thickness and an annular mirror surface which partly defines the mold cavity 14. A stamper holder 32 extends through central portions of the annular movable mirror block 28 and the back plate 30, in the axial direction of the annular mirror block 28. The stamper holder 32 is a generally cylindrical sleeve having a tapered end portion received in the center bore of the mirror block 28. The stamper holder 32 is secured to the body of the movable mold half 12 by screws or other suitable fastening fasteners.

The stamper holder 32 has a center bore in which is received a portion of a stationary guide sleeve 34 fixed to the mold half 12. The stationary guide sleeve 34 has a center bore in which is slidably movably received an ejector sleeve 38 for removing the formed component disk 54a, 54b. The ejector sleeve 38 is axially reciprocable by a suitable drive mechanism by a predetermined distance, while being guided by the inner surface of the stationary guide sleeve 34. The ejector sleeve 38 has a center bore in which is axially slidably received a male cutter sleeve 40 which cooperates with the female cutter sleeve 21 of the stationary mold half 10 to remove the central portion of the formed component disk 54a, 54b, for thereby forming the center hole in the component disk. The male cutter sleeve 40 has a center bore in which is received a reciprocating sleeve 41. This reciprocating sleeve 41 is axially reciprocated by a suitable drive mechanism, to reciprocate the male cutter sleeve 40. the reciprocating sleeve 41 has a center bore in which is axially slidably received an ejector pin 42 that can projects from the axial end face of the male cutter sleeve 40 toward the stationary mold half 10, for removing the central portion of the component disk 54a, 54b which has been removed by the female and male cutter sleeves 21, 40.

Figure 2:
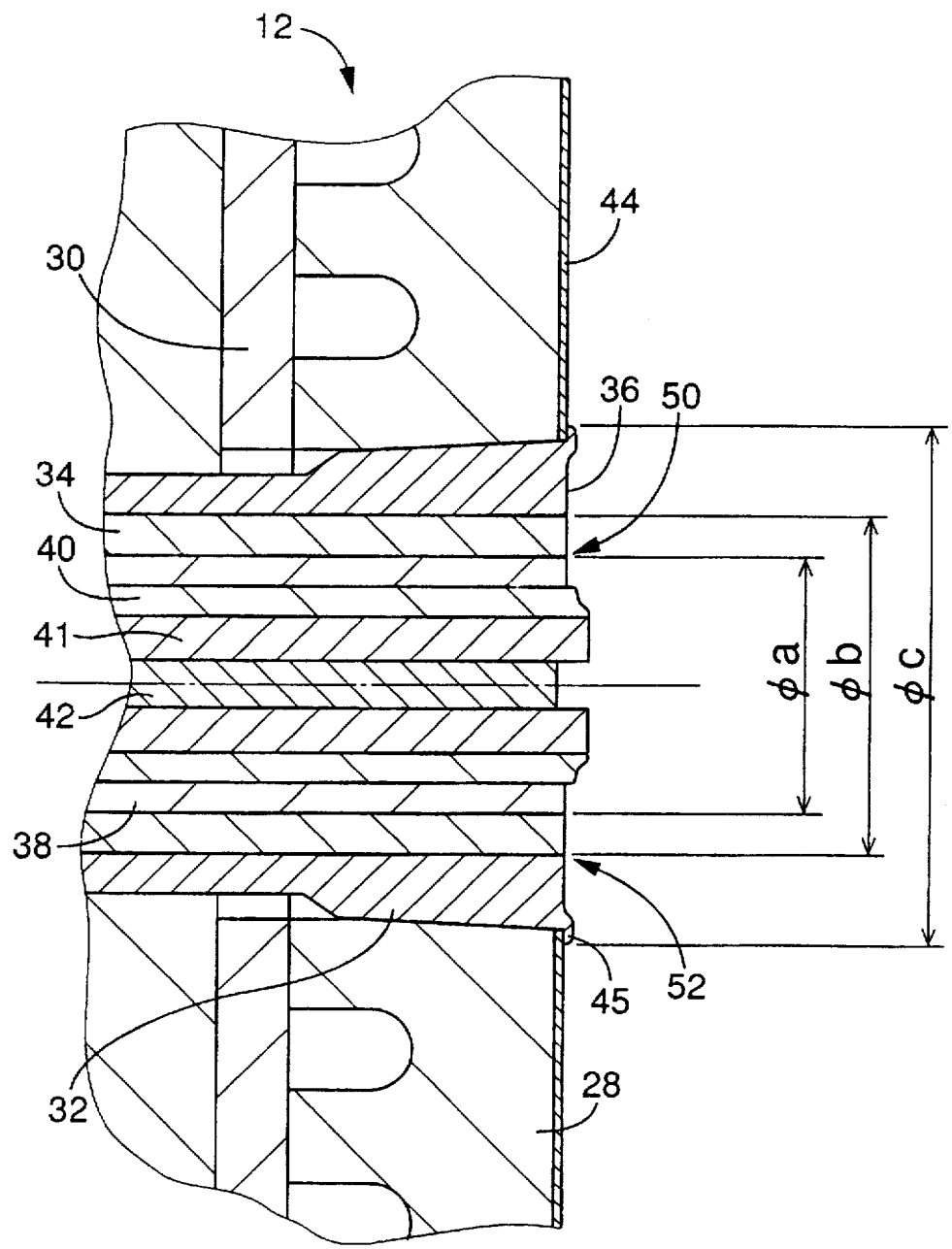
FIG. 2 is an enlarged view showing a part of the mold of FIG. 1.

A stamper 44 in the form of a relatively thin annular plate is placed on the annular mirror surface of the movable mirror block 28. As shown in FIG. 2, the annular stamper 44 is clamped at its inner circumferential edge by an annular retainer portion 45 of the stamper holder 32. The annular retainer portion 45 is formed along the outer edge of the annular axial end face of the stamper holder 32. The stamper 44 is clamped at its outer peripheral portion by an outer retainer ring 46 fixed to the body of the movable mold half 12, as shown in FIG. 1. Thus, the stamper 44 is held on the mirror surface of the movable mirror block 28. As well known in the art, the stamper 44 stores desired information in the form of submicrometer-sized depressions or holes.

The movable mold half 12 provided with the stamper 44 has a second molding surface 36 provided by the annular information-bearing surface of the stamper 44 and the axial end faces of the stamper holder 332, stationary guide sleeve 34 and ejector sleeve 38 that are concentric or coaxial with the annular stamper 44. The second molding surface 36 cooperates with the first molding surface 22 to define the mold cavity 14 and functions to form the information-bearing surface or bonding surface of the first or second component disk 54a, 54b. That is, the information stored on the stamper 44 is copied on the bonding surface of the component disk 54a, 54b. To facilitate removal of the formed component disk 54a, 54b, a stream of compressed air is supplied to the second molding surface 36 through a clearance between the ejector sleeve 38 and the stationary guide sleeve 34.

The first mold for forming the first component disk 54a and the second mold for forming the second component disk 54b are basically identical with each other in construction, each having the stationary mold half 10 and the movable mold half 12. However, the dimensions of the components 32, 34, 38 of the movable mold half 12 of the first mold are different from those of the second mold, as described below.

The axial end faces of the stamper holder 32, stationary guide sleeve 34 and ejector sleeve 38 are mutually concentrically located in the center hole of the stamper 44, and cooperate with the stamper 44 to define the second molding surface 36. As indicated in FIG. 2, the ejector sleeve 38 and the stationary guide sleeve 34 have respective outside diameters Φa and Φb, while the stationary guide sleeve 34 and the stamper holder 32 have respective inside diameters Φa' and Φb'. The inside diameter Φa' of the stationary guide sleeve 34 is almost equal to but is slightly larger than the outside diameter Φa of the ejector sleeve 38, and the inside diameter Φb' of the stamper holder 32 is almost equal to but is slightly larger than the outside diameter Φb of the stationary guide sleeve 34. The diameter values Φa, Φa', Φb and Φb' of the first mold for forming the first component disk 54a are different from those of the second mold for forming the second component disk 54b, for the reason which will be described. Accordingly, an annular boundary 50 between the stationary guide sleeve 34 and the ejector sleeve 38 and an annular boundary 52 between the stationary sleeve 34 and the stamper holder 32 in the first mold have diameters different from those in the second mold. Although an outside diameter Φc of the stamper holder 32 in the first mold may be made different from that in the second mold, the present embodiment of the invention is adapted such that the outside diameter Φc in the first mold is the same in the second mold.

Figure 3:
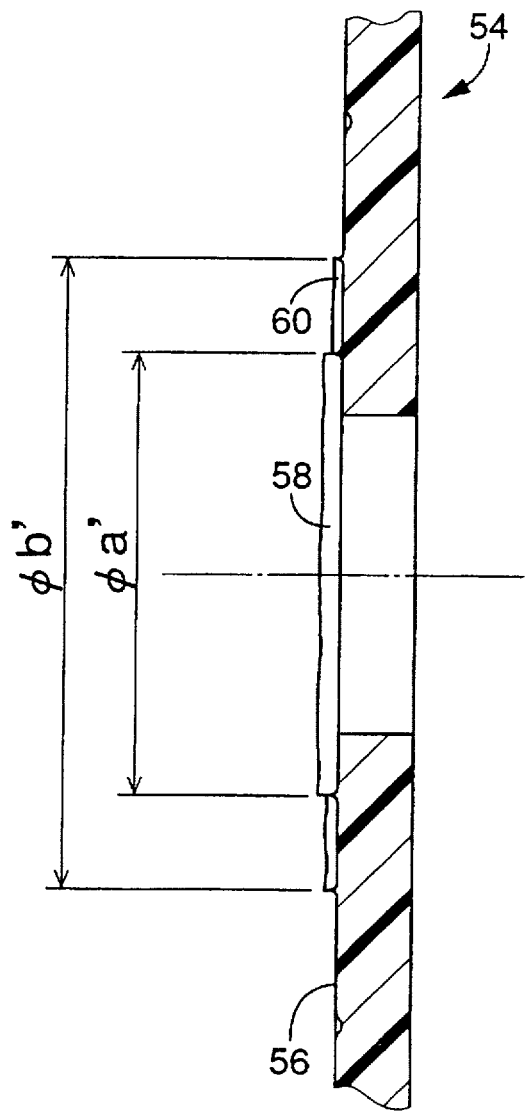
FIG. 3 is an enlarged view in cross section showing a part of a component disk formed by the mold of FIG. 1.

Referring to FIG. 3, there is shown a component disk 54 produced by one of the first and second molds constructed as described above. The component disk 54 has an information-bearing surface or bonding surface 56 on which the information stored on the stamper 42 has been copied as a result of production of the disk 54 by the appropriate mold. As indicated in FIG. 3, the information-bearing surface 56 may have an annular burr 58 between the ejector sleeve 38 and the stationary guide sleeve 34, and an annular burr 60 between the stationary guide sleeve 34 and the stamper holder 32. These annular burrs 58, 60 may be formed due to flows of the resin material through a clearance between the sleeves 38, 34 and a clearance between the sleeve 34 and the stamper holder 32. Because the diameters of the annular boundaries 50, 52 in the first mold are different from those of the annular boundaries 50, 52 in the second mold, the diameters Φa'1 and Φb'1 of the annular burrs 58, 60 formed on the first component disk 54a are different from the diameters Φa'2 and Φb'2 of the annular burrs 58, 60 formed on the second component disk 54b, as indicated in FIG. 4.

The first and second component disks 54a, 54b produced by the first and second molds are superposed on each other such that an adhesive layer 62 is interposed between the information-bearing surfaces 56 of the two component disks 54a, 54b, whereby a digital video disk (DVD) is produced as the bonded composite disk according to the present invention. Since the annular burrs 58, 60 formed on the first component disk 54a are radially offset from those formed on the second component disk 54b, the annular burrs 58, 60 on the first disk 54a and the annular burrs 58, 60 on the second disk 54b are not superposed on each other. In the specific example of FIG. 4, the diameter Φa'1 of the annular burr 58 of the first component disk 54a is smaller than the diameter Φa'2 of the annular burr 58 of the second component disk 54b, while the diameter Φb'1 of the annular burr 60 of the first component disk 54a is smaller than the diameter Φb'2 of the annular burr 60 of the second component disk 54b. The differences between the diameters Φa'1 and Φa'2 are determined so that the annular burrs 58, 60 on the first component disk 54a do not interference with the annular burrs 58, 60 on the second component disk 54b when the two disks 54a, 54b are superposed on each other with the adhesive layer 62 interposed therebetween.

If the diameter Φa'1 of the annular burr 58 on the first component disk 54a was equal to the diameter Φa'2 of the annular burr 58 on the second component disk 54b, and suppose the annular burr 58 formed on each of the first and second component disks 54a, 54b has a thickness of 30 μm, for example, the two annular burrs 58, 58 of the two disks 54a, 54b would abut on each other when the two disks 54a, 54b are superposed on each other, and would act as a spacer which inevitably spaces the information-bearing surfaces 56 of the two disks 54a, 54b apart from each other by a considerable distance, and prevents the adhesive layer 62 from having a desired or nominal thickness, for example, 40 μm. In the present embodiment, however, the diameters Φa, Φa', Φb, Φb' of the first mold for forming the first component disk 54a, are made different from those of the second mold for forming the second component disk 54b, whereby the two annular burrs 58 (and the annular burrs 60) formed on the respective disks 54a, 54b have different diameters and are offset or spaced from each other in the radial direction. In other words, the two annular burrs 58 (each having a thickness or height of 30 μm, for example) do not interference with each other, permitting the two disks 54a, 54b to be located close to each other with the adhesive layer 62 having a desired thickness, for example, 40 μm or smaller. The thickness of the adhesive layer 62 determines the spacing between the two disks 54a, 54b, which determines the overall thickness of the obtained bonded composite disk.

In the present embodiment, therefore, the formed bonded composite disk has excellent bonding strength and improved accuracy of its thickness. In other words, the method of producing the composite disk using the molds constructed according to the present invention assures significantly improved production efficiency and yield ratio or reduced ratio of rejects.

While the present invention has been described in detail in its presently preferred embodiment by reference to the accompanying drawings, for illustrative purpose only, it is to be understood that the invention is not limited to the details of the illustrated embodiment.

In the illustrated embodiment, the stamper 44 is fixed to the movable mold half 12 so as to provide the second molding surface 36 to form the information-bearing surface of the component disk 54. However, the stamper 44 may be fixed to the stationary mold half 10. In this case, the dimensions of the components which partially define the molding surface of the stationary mold half 10 in the first mold are made different from those in the second mold.

In the illustrated embodiment, the annular boundaries 50, 52 between the ejector and stationary guide sleeves 38, 34 and between the sleeve 34 and the stamper holder 32 in the first mold have diameters different from those of the annular boundaries 50, 52 in the second mold. However, only one of these two annular boundaries of the components 32, 34, 38 at which the burr is likely to be formed on the information-bearing surface 56 of the component disk 54 may have different diameters in the first and second molds. Further, as indicated above, the outside diameter of the the stamper holder 32 in the first mold may be different from that in the second mold.

The components of the movable or stationary mold half which cooperate with the stamper 44 to define a molding surface for forming the information-bearing surface 56 of the component disk 54 are not limited to the details of the illustrated embodiment, but may be suitably arranged, constructed and shaped depending upon the configuration of the mold.

Although both of the first and second component disks 54a, 54b have the information-bearing surface 56 on which the information stored on the stamper 44 is copied, the principle of the present invention is equally applicable to a bonded composite disk wherein only one of the two component disks has the information-bearing surface while the other component disk serves as a dummy disk without an information-bearing surface.

It is to be understood that the present invention may be embodied with various other changes, modifications and improvements, which may occur to those skilled in the art, in the light of the foregoing teachings, without departing from the spirit and scope of the invention defined in the following claims.

What is claimed is:

1. A bonded composite disk consisting of a first component disk and a second component disk which are formed separately from each other and which are bonded together at respective bonding surfaces thereof with a layer of a bonding adhesive interposed between the bonding surfaces, said first and second component disks being produced by a method comprising the steps of:

preparing a first mold and a second mold each of which includes a stationary mold half and a movable mold half which have respective first and second molding surfaces cooperating to define therebetween a mold cavity for forming a corresponding one of said first and second component disks, one of said first and second molding surfaces of said each mold functioning to form the bonding surface of said corresponding one of said first and second component disks, said each mold including a plurality of mutually concentric components having respective axial end faces which cooperate to define said one of said first and second molding surface, said mutually concentric components being dimensioned such that each of at least one of a plurality of first annular boundaries between adjacent ones of said mutually concentric components in said first mold, which first annular boundaries are located on said one of said first and second molding surfaces of said stationary and movable mold halves, has a diameter different from that of a corresponding one of at least one of a plurality of second annular boundaries between adjacent ones of said mutually concentric components in said second mold;

forming said first and second component disks of said bonded composite disk by filling said mold cavities of said first and second molds with a material of each of said first and second component disks; and superposing said first and second component disks such that said bonding surfaces each formed by said one of said first and second molding surfaces of said stationary and movable mold halves of said each mold are opposed to each other, with said layer of the bonding adhesive being interposed between said bonding surfaces to bond said first and second component disks together to produce said bonded composite disk.

2. A bonded composite disk according to claim 1, wherein said bonding surface of at least one of said first and second component disks consists of an information-bearing surface on which information has been copied from an annular stamper which is provided as one of said plurality of mutually concentric components.

3. A bonded composite disk according to claim 1, wherein said first component disk has at least one annular burr at a portion thereof corresponding to said at least one of said plurality of first annular boundaries, while said second component disk has at least one annular burr at a portion thereof corresponding to said at least one of said plurality of second annular boundaries.

4. A method of producing a bonded composite disk consisting of a first component disk and a second component disk which are formed separately from each other and which are bonded together at respective bonding surfaces thereof with a layer of a bonding adhesive interposed between the bonding surfaces, said method comprising the steps of:

preparing a first mold and a second mold each of which includes a stationary mold half and a movable mold half which have respective first and second molding surfaces cooperating to define therebetween a mold cavity for forming a corresponding one of said first and second component disks, one of said first and second molding surfaces of said each mold functioning to form the bonding surface of said corresponding one of said first and second component disks, said each mold including a plurality of mutually concentric components having respective axial end faces which cooperate to define said one of said first and second molding surface, said mutually concentric components being dimensioned such that each of at least one of a plurality of first annular boundaries between adjacent ones of said mutually concentric components in said first mold, which first annular boundaries are located on said one of said first and second molding surfaces of said stationary and movable mold halves, has a diameter different from that of a corresponding one of at least one of a plurality of second annular boundaries between adjacent ones of said mutually concentric components in said second mold;

forming said first and second component disks of said bonded composite disk by filling said mold cavities of said first and second molds with a material of each of said first and second component disks; and superposing said first and second component disks such that said bonding surfaces each formed by said one of said first and second molding surfaces of said stationary and movable mold halves of said each mold are opposed to each other, with said layer of the bonding adhesive being interposed between said bonding surfaces to bond said first and second component disks together to produce said bonded composite disk.

5. A method according to claim 4, wherein said step of forming said first and second component disks comprises holding in said each mold an annular stamper as one of said plurality of mutually concentric components, such that the other ones of said mutually concentric components extend through a center bore of said annular stamper, said annular stamper storing information which is copied on the bonding surface of each of said first and second component disks formed by filling said mold cavities each of which is partially defined by a surface of said annular stamper.

6. A method according to claim 5, wherein said other ones of said mutually concentric components include an annular stamper holder for holding said annular stamper, a stationary guide sleeve and an ejector sleeve, and said step of preparing a first mold and a second mold comprises assembling said annular stamper holder, said stationary guide sleeve and said ejector sleeve such that said annular stamper holder extends through said center bore of said annular stamper and such that said stationary guide sleeve is partially fixedly received in a center bore of said annular stamper holder, while said ejector sleeve is axially slidably received in a center bore of said stationary guide sleeve, for removing the corresponding one of said first and second component disks from the corresponding one of said first and second molds.

7. A method according to claim 6, wherein said step of preparing a first mold and a second mold comprises forming said ejector sleeve and said stationary guide sleeve of said first mold such that an outside diameter of said ejector sleeve and an inside diameter of said stationary guide sleeve of said first mold are different from respective outside and inside diameters of said ejector sleeve and said stationary guide sleeve of said second mold.

8. A method according to claim 6, wherein said step of preparing a first mold and a second mold comprises forming said stationary guide sleeve and said annular stamper holder of said first mold such that an outside diameter of said stationary guide sleeve and an inside diameter of said annular stamper holder of said first mold are different from respective outside and inside diameters of said stationary guide sleeve and said annular stamper holder of said second mold.

9. A method according to claim 6, wherein said preparing a first mold and a second mold comprises forming each of said first and second mold such that said movable mold half includes said annular stamper, said annular stamper holder, said stationary guide sleeve and said ejector sleeve.

10. An apparatus for forming a first component disk and a second component disk which are bonded together at respective bonding surfaces thereof with a layer of a bonding adhesive to produce a bonded composite disk, said apparatus comprising:

a first mold including a plurality of first mutually concentric components having respective axial end faces which cooperate to define one of a first and a second molding surfaces which cooperate to define therebetween a first mold cavity for forming said first component disk, said one of said first and second molding surfaces functioning to form the bonding surface of said first component disk;

a second mold including a plurality of second mutually concentric components having respective axial end faces which cooperate to define one of a first and a second molding surfaces which cooperate to define therebetween a second mold cavity for forming said second component disk, said one of said first and second molding surfaces of said second mold functioning to form the bonding surface of said second component disk; and said plurality of first mutually concentric components of said first mold being dimensioned such that each of at least one of a plurality of first annular boundaries between adjacent ones of said first mutually concentric components of said first mold, which first annular boundaries are located on said one of said first and second molding surfaces, has a diameter different from that of a corresponding one of at least one of a plurality of second annular boundaries between adjacent ones of said second mutually concentric components of said second mold.

11. An apparatus according to claim 10, wherein said plurality of first mutually concentric components of said first mold include a first ejector sleeve axially movable for removing said first component disk from said first mold, while said plurality of second mutually concentric components of said second mold include a second ejector sleeve axially movable for removing said second component disk from said second mold, at least one of an outside diameter and an inside diameter of said first ejector sleeve being different from the corresponding diameter of said second ejector sleeve.

12. An apparatus according to claim 11, wherein said plurality of first mutually concentric components further include a first annular stamper storing information which is copied on the bonding surface of said first component disk formed by filling said first mold cavity which is partially defined by a surface of said first annular stamper, said plurality of second mutually concentric components further include a second annular stamper storing information which is copied on the bonding surface of said second component disk formed by filling said second mold cavity which is partially defined by a surface of said second annular stamper.

13. An apparatus according to claim 12, wherein said plurality of first mutually concentric components further include a first annular stamper holder extending through said center bore of said first annular stamper for holding said first annular stamper, and a first stationary sleeve which is partially fixedly received in a center bore of said first annular stamper holder and which has a center bore through which said first ejector sleeve is axially slidably received, said plurality of second mutually concentric components further include a second annular stamper holder extending through said center bore of said second annular stamper for holding said second annular stamper, and a second stationary sleeve which is partially fixedly received in a center bore of said second annular stamper holder and which has a center bore through which said second ejector sleeve is axially slidably received.

14. An apparatus according to claim 13, wherein an outside diameter of said first ejector sleeve and said inside diameter of said first stationary guide sleeve of said first mold are different from respective outside and inside diameters of said second ejector sleeve and said second stationary guide sleeve of said second mold.

15. An apparatus according to claim 13, wherein said outside diameter of said first stationary guide sleeve and an inside diameter of said first annular stamper holder of said first mold are different from respective outside and inside diameters of said second stationary guide sleeve and said second annular stamper holder of said second mold.

16. An apparatus according to claim 12, wherein each of said first and second mold includes a stationary mold half and a movable mold half, said first and second annular stampers being fixedly provided in the movable mold halves of said first and second molds, respectively.

* * * * *